United States Patent
Brinton et al.

(10) Patent No.: US 7,944,345 B2
(45) Date of Patent: *May 17, 2011

(54) SYSTEM AND PROCESS TO ENSURE PERFORMANCE OF MANDATED SAFETY AND MAINTENANCE INSPECTIONS

(75) Inventors: Brett Brinton, Burien, WA (US);
Charles Michael McQuade, Issquah, WA (US); William Brinton, Jr., Kent, WA (US); Daniel Mayer, Issaquah, WA (US); Eric Manegold, Federal Way, WA (US); Richard Lugash, Los Angeles, CA (US); Robie G. Russell, Seattle, WA (US)

(73) Assignee: Zonar Systems, Inc., Seattle, WA (US)

( * ) Notice: Subject to any disclaimer, the term of this patent is extended or adjusted under 35 U.S.C. 154(b) by 51 days.

This patent is subject to a terminal disclaimer.

(21) Appl. No.: 12/475,309

(22) Filed: May 29, 2009

(65) Prior Publication Data
US 2009/0248362 A1 Oct. 1, 2009

Related U.S. Application Data

(63) Continuation of application No. 10/915,957, filed on Aug. 11, 2004, now Pat. No. 7,557,696, which is a continuation-in-part of application No. 10/219,892, filed on Aug. 15, 2002, now Pat. No. 6,804,626, which is a continuation-in-part of application No. 09/951,104, filed on Sep. 11, 2001, now Pat. No. 6,671,646.

(51) Int. Cl.
*B60Q 1/00* (2006.01)

(52) U.S. Cl. ........ 340/439; 340/422; 340/453; 340/576; 340/870.16; 340/933; 340/938; 235/380; 702/127; 702/183

(58) Field of Classification Search .................. 340/439, 340/442, 453, 539.1, 576, 870.16, 933, 938; 235/376, 380; 701/33, 35; 702/127, 183
See application file for complete search history.

(56) References Cited

U.S. PATENT DOCUMENTS 3,573,620 A 4/1971 Ashley et al. ................. 235/376
(Continued)

FOREIGN PATENT DOCUMENTS

CA 2 138 378 11/1994
(Continued)

OTHER PUBLICATIONS

Albright, Brian: "Indiana Embarks on Ambitious RFID roll out." *Frontline Solutions.* May 20, 2002; 2pp. Available at: <http://www.frontlinetoday.com/frontline/article/articleDetail.jsp?id=19358>.

(Continued)

*Primary Examiner* — Hung T. Nguyen
(74) *Attorney, Agent, or Firm* — Ronald M. Anderson

(57) ABSTRACT

A handheld, portable device is used to store data that indicates an operator was sufficiently close to each of a plurality of components during a safety inspection to actually inspect the components. The portable device includes a sensor that detects tokens, such as radio frequency identification tags, which are affixed adjacent to the components. Messages appearing on a display of the portable device prompt the operator to proceed to each checkpoint, determine a state of the component disposed there, and if the component is not operating properly, indicate a plurality of predefined conditions from which the operator can choose to identify the observed condition of the component. The state and condition of each component entered during the safety inspection are stored as data that are subsequently transferred to a remote data storage site over a wire or wireless link.

20 Claims, 4 Drawing Sheets

U.S. PATENT DOCUMENTS

| | | | |
|---|---|---|---|
| 3,990,067 A | 11/1976 | Van Dusen et al. | 340/306 |
| 4,025,791 A | 5/1977 | Lennington et al. | 250/341 |
| 4,092,718 A | 5/1978 | Wendt | 364/436 |
| 4,258,421 A | 3/1981 | Juhasz et al. | 364/424 |
| 4,263,945 A | 4/1981 | Van Ness | 141/98 |
| 4,325,057 A | 4/1982 | Bishop | 340/539 |
| 4,469,149 A | 9/1984 | Walkey et al. | 141/94 |
| 4,602,127 A | 7/1986 | Neely et al. | 379/68 |
| 4,658,371 A | 4/1987 | Walsh et al. | 364/550 |
| 4,763,356 A | 8/1988 | Day, Jr. et al. | 379/368 |
| 4,799,162 A | 1/1989 | Shinakawa et al. | 364/436 |
| 4,804,937 A | 2/1989 | Barbiaux et al. | 340/52 F |
| 4,846,233 A | 7/1989 | Fockens | 141/94 |
| 4,897,792 A | 1/1990 | Hosoi | 364/449 |
| 4,934,419 A | 6/1990 | Lamont et al. | 141/94 |
| 5,058,044 A | 10/1991 | Stewart et al. | 364/551.01 |
| 5,068,656 A | 11/1991 | Sutherland | 340/989 |
| 5,072,380 A | 12/1991 | Randelman et al. | 364/406 |
| 5,120,942 A | 6/1992 | Holland | 235/376 |
| 5,128,651 A | 7/1992 | Heckart | 340/433 |
| 5,204,819 A | 4/1993 | Ryan | 364/465 |
| 5,206,643 A | 4/1993 | Eckelt | 340/932.2 |
| 5,223,844 A | 6/1993 | Mansell et al. | 342/357.07 |
| 5,243,323 A | 9/1993 | Rogers | 340/433 |
| 5,321,629 A | 6/1994 | Shirata et al. | 702/187 |
| 5,337,003 A | 8/1994 | Carmichael et al. | 324/402 |
| 5,359,522 A | 10/1994 | Ryan | 364/465 |
| 5,394,136 A | 2/1995 | Lammers et al. | 340/439 |
| 5,399,844 A | 3/1995 | Holland | 235/376 |
| 5,442,553 A | 8/1995 | Parillo | 364/424.04 |
| 5,459,304 A | 10/1995 | Eisenmann | 235/380 |
| 5,459,660 A | 10/1995 | Berra | 701/33 |
| 5,488,352 A | 1/1996 | Jasper | 340/431 |
| 5,499,182 A | 3/1996 | Ousborne | 364/424.04 |
| 5,541,845 A | 7/1996 | Klein | 364/449 |
| 5,546,305 A | 8/1996 | Kondo | 364/424.03 |
| 5,557,254 A | 9/1996 | Johnson et al. | 340/426 |
| 5,557,268 A | 9/1996 | Hughes et al. | 340/933 |
| 5,572,192 A | 11/1996 | Berube | 340/574 |
| 5,585,552 A | 12/1996 | Heuston et al. | 73/116 |
| 5,596,501 A | 1/1997 | Comer et al. | 364/464.23 |
| 5,600,323 A | 2/1997 | Boschini | 341/173 |
| 5,610,596 A | 3/1997 | Petitclerc | 340/825.23 |
| 5,623,258 A | 4/1997 | Dorfman | 340/825.08 |
| 5,629,678 A | 5/1997 | Gargano et al. | 340/573.4 |
| 5,671,158 A | 9/1997 | Fournier et al. | 345/8 |
| 5,680,328 A | 10/1997 | Skorupski et al. | 364/550 |
| 5,719,771 A | 2/1998 | Buck et al. | 364/443 |
| 5,731,893 A | 3/1998 | Dominique | 359/742 |
| 5,742,915 A | 4/1998 | Stafford | 701/35 |
| 5,745,049 A * | 4/1998 | Akiyama et al. | 340/870.17 |
| 5,758,299 A | 5/1998 | Sandborg et al. | 701/29 |
| 5,758,300 A | 5/1998 | Abe | 701/33 |
| 5,781,871 A | 7/1998 | Mezger et al. | 701/33 |
| 5,808,565 A | 9/1998 | Matta et al. | 340/994 |
| 5,809,437 A | 9/1998 | Breed | 701/29 |
| 5,815,071 A | 9/1998 | Doyle | 340/439 |
| 5,838,251 A | 11/1998 | Brinkmeyer et al. | 340/825.31 |
| 5,839,112 A | 11/1998 | Schreitmueller et al. | 705/4 |
| 5,874,891 A | 2/1999 | Lowe | 340/433 |
| 5,884,202 A | 3/1999 | Arjomand | 701/29 |
| 5,890,061 A | 3/1999 | Timm et al. | 455/404 |
| 5,890,520 A | 4/1999 | Johnson, Jr. | 141/94 |
| 5,913,180 A | 6/1999 | Ryan | 702/45 |
| 5,922,037 A | 7/1999 | Potts | 701/29 |
| 5,923,572 A | 7/1999 | Pollock | 364/528.17 |
| 5,942,753 A | 8/1999 | Dell | 250/338.1 |
| 5,956,259 A | 9/1999 | Hartsell, Jr. et al. | 364/528.37 |
| 5,995,898 A | 11/1999 | Tuttle | 701/102 |
| 6,009,363 A | 12/1999 | Beckert et al. | 701/33 |
| 6,016,795 A | 1/2000 | Ohki | 123/681 |
| 6,024,142 A | 2/2000 | Bates | 141/94 |
| 6,043,661 A | 3/2000 | Gutierrez | 324/504 |
| 6,054,950 A | 4/2000 | Fontana | 342/463 |
| 6,061,614 A | 5/2000 | Carrender et al. | 701/33 |
| 6,064,299 A | 5/2000 | Lesesky et al. | 340/431 |
| 6,070,156 A | 5/2000 | Hartsell, Jr. | 705/413 |
| 6,078,255 A | 6/2000 | Dividock et al. | 340/539 |
| 6,084,870 A | 7/2000 | Wooten et al. | 370/349 |
| 6,092,021 A | 7/2000 | Ehlbeck et al. | 701/123 |
| 6,107,915 A | 8/2000 | Reavell et al. | 340/433 |
| 6,107,917 A | 8/2000 | Carrender et al. | 340/505 |
| 6,112,152 A | 8/2000 | Tuttle | 701/115 |
| 6,128,551 A | 10/2000 | Davis et al. | 700/236 |
| 6,128,959 A | 10/2000 | McGovern et al. | 73/660 |
| 6,169,938 B1 | 1/2001 | Hartsell, Jr. | 700/302 |
| 6,169,943 B1 | 1/2001 | Simon et al. | 701/29 |
| 6,208,948 B1 | 3/2001 | Klingler et al. | 702/183 |
| 6,236,911 B1 | 5/2001 | Kruger | 701/1 |
| 6,240,365 B1 | 5/2001 | Bunn | 701/213 |
| 6,253,129 B1 | 6/2001 | Jenkins et al. | 701/29 |
| 6,256,579 B1 | 7/2001 | Tanimoto | 701/201 |
| 6,259,358 B1 | 7/2001 | Fjordbotten | 340/433 |
| 6,263,273 B1 | 7/2001 | Henneken et al. | 701/51 |
| 6,285,953 B1 | 9/2001 | Harrison et al. | 701/213 |
| 6,339,745 B1 | 1/2002 | Novik | 701/208 |
| 6,370,454 B1 | 4/2002 | Moore | 701/29 |
| 6,374,176 B1 | 4/2002 | Schmier et al. | 701/200 |
| 6,396,413 B2 | 5/2002 | Hines et al. | 340/825.49 |
| 6,411,203 B1 | 6/2002 | Lesesky et al. | 340/431 |
| 6,411,891 B1 | 6/2002 | Jones | 701/201 |
| 6,417,760 B1 * | 7/2002 | Mabuchi et al. | 340/5.3 |
| 6,438,472 B1 | 8/2002 | Tano et al. | 701/35 |
| 6,450,411 B1 | 9/2002 | Rash et al. | 236/44 A |
| 6,456,039 B1 | 9/2002 | Lauper et al. | 320/107 |
| 6,502,030 B2 | 12/2002 | Hilleary | 701/207 |
| 6,505,106 B1 | 1/2003 | Lawrence | 701/35 |
| 6,529,808 B1 | 3/2003 | Diem | 701/29 |
| 6,539,296 B2 | 3/2003 | Diaz et al. | 701/33 |
| 6,594,579 B1 | 7/2003 | Lowrey et al. | 701/123 |
| 6,594,621 B1 | 7/2003 | Meeker | 702/185 |
| 6,597,973 B1 | 7/2003 | Barich et al. | 701/29 |
| 6,604,033 B1 | 8/2003 | Banet et al. | 701/33 |
| 6,608,554 B2 | 8/2003 | Weant et al. | 340/431 |
| 6,609,082 B2 | 8/2003 | Wagner | 702/182 |
| 6,611,740 B2 | 8/2003 | Lowrey et al. | 701/29 |
| 6,614,392 B2 | 9/2003 | Howard | 342/357.07 |
| 6,616,036 B2 | 9/2003 | Streicher et al. | 235/381 |
| 6,621,452 B2 | 9/2003 | Knockeart et al. | 342/357.09 |
| 6,636,790 B1 | 10/2003 | Lightner et al. | 701/33 |
| 6,664,897 B2 | 12/2003 | Pape et al. | 340/573.3 |
| 6,671,646 B2 | 12/2003 | Manegold et al. | 702/127 |
| 6,708,113 B1 | 3/2004 | Von Gerlach et al. | 701/210 |
| 6,714,859 B2 | 3/2004 | Jones | 701/201 |
| 6,727,818 B1 | 4/2004 | Wildman et al. | 340/573.1 |
| 6,732,031 B1 | 5/2004 | Lowrey et al. | 701/33 |
| 6,732,032 B1 | 5/2004 | Banet et al. | 701/33 |
| 6,744,352 B2 | 6/2004 | Lesesky et al. | 340/431 |
| 6,754,183 B1 | 6/2004 | Razavi et al. | 370/254 |
| 6,804,606 B2 | 10/2004 | Jones | 701/213 |
| 6,804,626 B2 | 10/2004 | Manegold et al. | 702/182 |
| 6,834,259 B1 | 12/2004 | Nicholson et al. | 702/187 |
| 6,856,820 B1 | 2/2005 | Kolls | 455/575.9 |
| 6,880,390 B2 | 4/2005 | Emord | 701/103 |
| 6,894,617 B2 | 5/2005 | Richman | 340/573.1 |
| 6,897,894 B1 | 5/2005 | Miyazawa | 701/33 |
| 6,899,151 B1 | 5/2005 | Latka et al. | 141/392 |
| 6,904,359 B2 | 6/2005 | Jones | 701/204 |
| 6,909,947 B2 | 6/2005 | Douros et al. | 701/29 |
| 6,928,348 B1 | 8/2005 | Lightner et al. | 701/33 |
| 6,946,953 B2 | 9/2005 | Lesesky et al. | 340/431 |
| 6,957,133 B1 | 10/2005 | Hunt et al. | 701/29 |
| 6,972,668 B2 | 12/2005 | Schauble | 340/438 |
| 6,988,033 B1 | 1/2006 | Lowrey et al. | 701/123 |
| 7,027,955 B2 | 4/2006 | Markwitz et al. | 702/187 |
| 7,048,185 B2 | 5/2006 | Hart et al. | 235/384 |
| 7,103,460 B1 | 9/2006 | Breed | 701/29 |
| 7,113,127 B1 | 9/2006 | Banet et al. | 342/357.07 |
| 7,117,121 B2 | 10/2006 | Brinton et al. | 702/182 |
| 7,155,199 B2 | 12/2006 | Zalewski et al. | 455/403 |
| 7,174,243 B1 | 2/2007 | Lightner et al. | 701/33 |
| 7,174,277 B2 | 2/2007 | Vock et al. | 702/188 |
| 7,225,065 B1 | 5/2007 | Hunt et al. | 701/29 |
| 7,228,211 B1 | 6/2007 | Lowrey et al. | 701/29 |
| 7,254,516 B2 | 8/2007 | Case, Jr. et al. | 702/182 |
| 7,343,252 B2 | 3/2008 | Wiens | 702/54 |
| 7,362,229 B2 | 4/2008 | Brinton et al. | 340/572.1 |

| | | | |
|---|---|---|---|
| 7,447,574 B1 | 11/2008 | Washicko et al. | 701/29 |
| 7,477,968 B1 | 1/2009 | Lowrey et al. | 701/29 |
| 7,480,551 B1 | 1/2009 | Lowrey et al. | 701/29 |
| 7,532,962 B1 | 5/2009 | Lowrey et al. | 701/29 |
| 7,532,963 B1 | 5/2009 | Lowrey et al. | 701/29 |
| 7,596,437 B1 | 9/2009 | Hunt et al. | 701/29 |
| 7,604,169 B2 | 10/2009 | Demere | 235/384 |
| 7,640,185 B1 | 12/2009 | Giordano et al. | 705/23 |
| 7,650,210 B2 | 1/2010 | Breed | 701/29 |
| 7,672,756 B2 | 3/2010 | Breed | 701/29 |
| 2001/0047283 A1 | 11/2001 | Melick et al. | 705/8 |
| 2001/0053983 A1 | 12/2001 | Reichwein et al. | 705/1 |
| 2002/0016655 A1 | 2/2002 | Joao | 701/35 |
| 2002/0022979 A1 | 2/2002 | Whipp et al. | 705/5 |
| 2002/0022984 A1 | 2/2002 | Daniel et al. | 705/8 |
| 2002/0065698 A1 | 5/2002 | Schick et al. | 705/8 |
| 2002/0107833 A1 | 8/2002 | Kerkinni | 707/1 |
| 2002/0107873 A1 | 8/2002 | Winkler et al. | 707/104.1 |
| 2002/0111725 A1 | 8/2002 | Burge | 701/29 |
| 2002/0122583 A1 | 9/2002 | Thompson | 382/141 |
| 2002/0133273 A1 | 9/2002 | Lowrey et al. | 701/29 |
| 2002/0133275 A1 | 9/2002 | Thibault | 701/35 |
| 2002/0147610 A1 | 10/2002 | Tabe | 705/1 |
| 2002/0150050 A1 | 10/2002 | Nathanson | 370/241 |
| 2002/0156558 A1 | 10/2002 | Hanson et al. | 701/33 |
| 2002/0163449 A1 | 11/2002 | Flick | 340/988 |
| 2002/0178147 A1 | 11/2002 | Arroyo et al. | 707/2 |
| 2002/0188593 A1 | 12/2002 | Moser et al. | 707/1 |
| 2003/0030550 A1 | 2/2003 | Talbot | 340/433 |
| 2003/0033061 A1 | 2/2003 | Chen et al. | 701/33 |
| 2003/0109973 A1 | 6/2003 | Hensey et al. | 701/35 |
| 2003/0120745 A1 | 6/2003 | Katagishi et al. | 709/217 |
| 2004/0009819 A1 | 1/2004 | Koga | 464/51 |
| 2004/0236596 A1 | 11/2004 | Chowdhary et al. | 705/1 |
| 2005/0273250 A1 | 12/2005 | Hamilton et al. | 701/200 |
| 2006/0232406 A1 | 10/2006 | Filibeck | 340/572.1 |
| 2007/0050193 A1 | 3/2007 | Larson | 705/1 |
| 2007/0069947 A1 | 3/2007 | Banet et al. | 342/357.09 |
| 2007/0179709 A1 | 8/2007 | Doyle | 701/29 |
| 2008/0154489 A1 | 6/2008 | Kaneda et al. | 701/201 |
| 2008/0154712 A1 | 6/2008 | Wellman | 705/11 |
| 2009/0069999 A1 | 3/2009 | Bos | 701/102 |
| 2010/0088127 A1 | 4/2010 | Betancourt et al. | 705/5 |

FOREIGN PATENT DOCUMENTS

| | | |
|---|---|---|
| CA | 2 326 892 | 10/1999 |
| CA | 2 388 572 | 5/2001 |
| EP | 0 755 039 | 6/1996 |
| EP | 0 814 447 | 5/1997 |
| EP | 1 067 498 | 7/2000 |
| EP | 1 271 374 | 6/2002 |
| EP | 2 116 968 | 11/2009 |
| WO | WO 98/03952 | 1/1998 |
| WO | WO 98/30920 | 7/1998 |
| WO | WO 03/023550 | 3/2003 |
| WO | WO 2007/092711 | 8/2007 |

OTHER PUBLICATIONS

Anonymous. "Transit agency builds GIS to plan bus routes." *American City & County*. vol. 118, No. 4. Published Apr. 1, 2003. 4pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

"Detex Announces the Latest Innovation in Guard Tour Verification Technology." *DETEX Life Safety, Security and Security Assurance*. Jan. 1, 2003. 1pp. © 2002-2004 Detex Corporation. <http://www.detex.com/NewsAction.jspa?id=3>.

"D.O.T. Driver Vehicle Inspection Reports on your wireless phone!" *FleeTTrakkeR$_{LLC}$ 2002-2003 FleeTTrakkeR$_{LLC}$* . All rights reserved <http://www.fleettrakker.com/web/index.jsp> Accessed Mar. 12, 2004.

Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Government: A Story Behind It's Ranking." *INCONTEXT Indiana;s Workforce and Economy*. Jan.-Feb. 2003 vol. 4, No. 5pp. Available at <http://www.incontext.indiana.edu/2003/jan-feb03/governement.html>.

"Nextel, Mortorola and Symbol Technologies Offer First Wireless Bar Code Scanner for Mobile Phones." Jun. 11, 2003. <http://theautochannel.com/news/2003/06/11/162927.htm>.

Quaan et al., "Guard Tour Systems." *Security Management ONLINE*. Sep. 16, 2003. 1pg. © 2000 <http://www.securitymanagement.com/ubb/Forum30/HTML/000066.html>.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving A Niche Beyond Asset Tracking." *Business Solutions*. Feb. 1999: 5pp. Available at: <http://www.businesssolutionsmag.com/Articles/1999_02/990208.html>.

"The Data Acquisition Unit Escorte." *The Proxi Escort.com*. Nov. 20, 2001. 4pp. Copyright © 2000 GCS General Control Systems. <http://www.gcs.at/eng/produkte/hw/escorte.htm>.

"The PenMaster" and "The PSION Workabout." Copyright 2000 GCS General Control Systems. <http://www.gcs.at/eng/produkte/hw/penmaster.htm>.

Tiscor: The Mobile Software Solutions Provider. *Inspection Manager: An Introduction*. Sep. 27, 2004. Slide presentation; 19pp. Available: www.TISCOR.com Tiscor: *Inspection Manager 6.0 User Guide*. USA; 2004. 1-73.

"Tracking out of route: software helps fleets compare planned routes to actual miles. (TECHNOLOGY)." *Commercial Carrier Journal*. Published Oct. 1, 2005. 4pp. NDN-219-1054-1717-0.

Tsakiri, M et al. Abstract: "Urban fleet monitoring with GPS and GLONASS." *Journal of Navigation*, vol. 51, No. 3. Published Sep. 1998. 2pp. NDN-174-0609-4097-3.

Want, Roy, "RFID A Key to Automating Everything." *Scientific American*, Jan. 2004, p. 58-65.

"What is the Child Check-Mate Safety System"? *2002 © Child Checkmate Systems Inc*. <http://www.childcheckmate.com/what.html>.

Tuttle, John R. "Digital RF/ID Enhances GPS" Proceedings of the Second Annual Wireless Symposium, pp. 406-411, Feb. 15-18, 1994, Santa Clara, CA.

Leavitt, Wendy., "The Convergence Zone." *FleetOwner*, 4pp. <www.driversmag.com/ar/fleet_convergence_zone/index.html> 1998.

Miras. "About SPS Technologies." 1pg., May 7, 1999.

Miras. "How MIRAS Works." 1pg., Apr. 29, 1999.

Miras. "Miras 4.0 Screenshot." 1pg., May 7, 1999.

Miras. "MIRAS Unit." 1pg., May 4, 1999.

Miras. "Monitoring Vehicle Functions." 1pg., Apr. 27, 1999.

Miras. "Remote Control." 1pg., Apr. 29, 1999.

Miras. "Tracking & Monitoring Software." 1pg., Apr. 29, 1999.

Sterzbach et al., "A Mobile Vehicle On-Board Computing and Communication System." *Comput. & Graphics*, vol. 20, No. 4: 659-667, 1996.

Zujkowski, Stephen. "Savi Technolgy, Inc.: Savi Security and Productivity Systems." *ATA Security Forum 2002*, Chicago, IL: 21pp., May 15, 2002.

N.a., "Private fleets moving to wireless communications." *FleetOwner*, 4pp. <www.driversmag.com/ar/fleet_private_fleets_moving/index.html> 1997.

N.a., "MIRAS GPS vehicle tracking using the Internet." *Business Wire*, 2pp., Nov. 22, 1996.

* cited by examiner

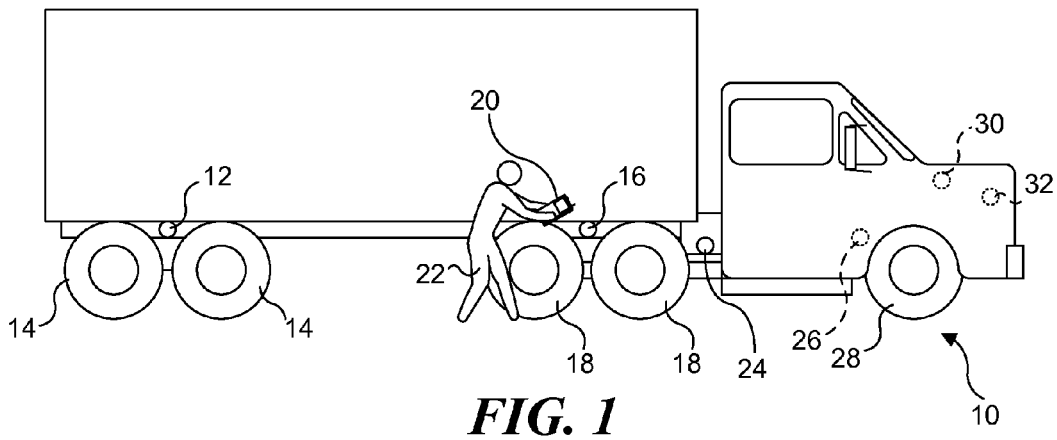
FIG. 1
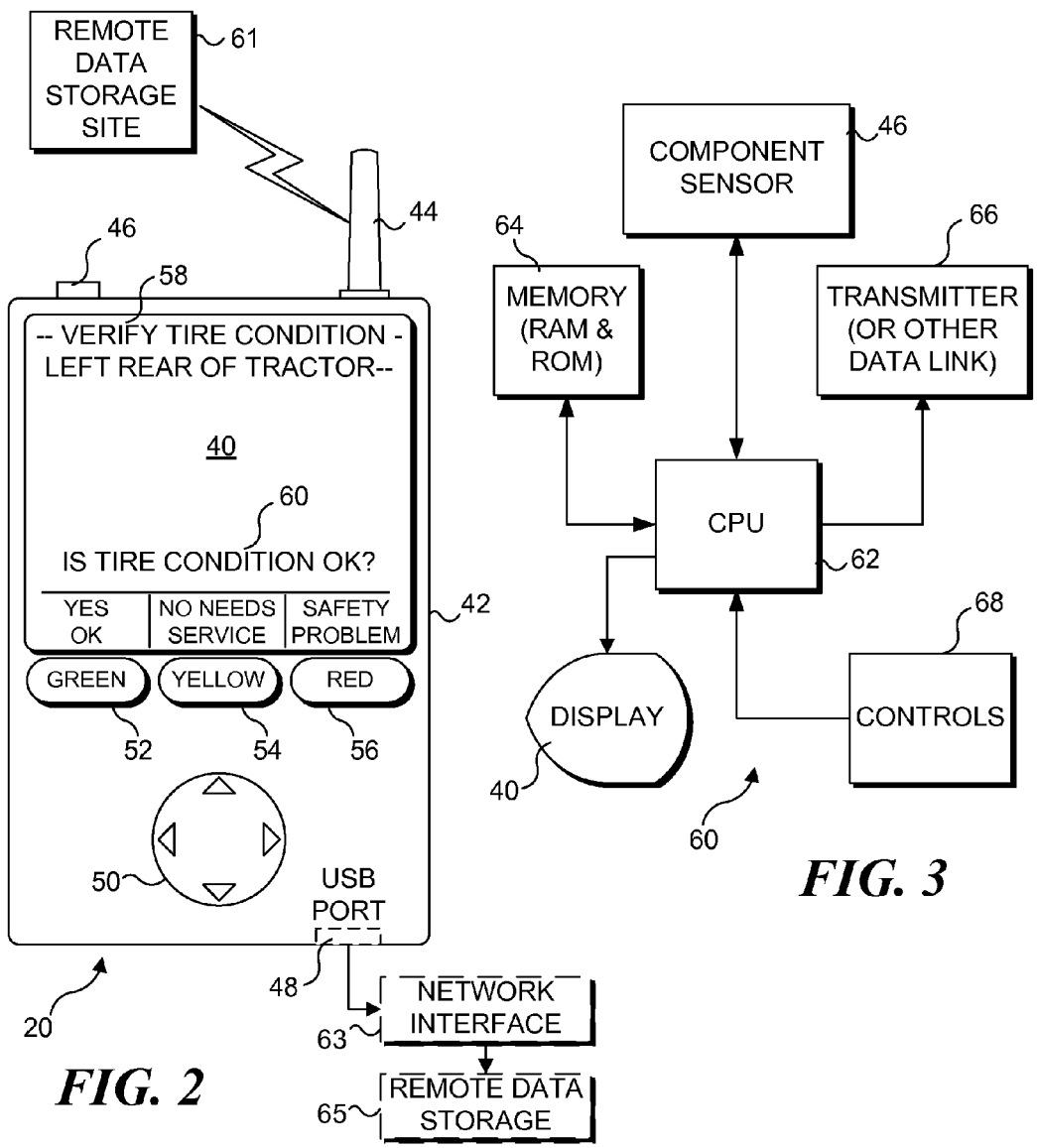
FIG. 2
FIG. 3

DRIVER'S VEHICLE INSPECTION REPORT
AS REQUIRED BY THE D.O.T. FEDERAL MOTOR CARRIER SAFETY REGULATIONS

CARRIER: _____

ADDRESS: _____

DATE: _____ TIME: _____ A.M. _____ P.M.

CHECK ANY DEFECTIVE ITEM AND GIVE DETAILS UNDER "REMARKS"

TRACTOR/
TRUCK NO. _____ ODOMETER READING _____

- ☐ AIR COMPRESSOR
- ☐ AIR LINES
- ☐ BATTERY
- ☐ BODY
- ☐ BRAKE ACCESSORIES
- ☐ BRAKES, PARKING
- ☐ BRAKES, SERVICE
- ☐ CLUTCH
- ☐ COUPLING DEVICE
- ☐ DEFROSTER/HEATER
- ☐ DRIVE LINE
- ☐ ENGINE
- ☐ EXHAUST
- ☐ FIFTH WHEEL
- ☐ FRAME AND ASSEMBLY
- ☐ FRONT AXLE
- ☐ FUEL TANKS
- ☐ GENERATOR

- ☐ HORN
- ☐ LIGHTS
  - HEAD - STOP
  - TAIL - DASH
  - TURN INDICATORS
- ☐ MIRRORS
- ☐ MUFFLER
- ☐ OIL PRESSURE
- ☐ RADIATOR
- ☐ REAR END
- ☐ REFLECTORS
- ☐ SAFETY EQUIPMENT
  - FIRE EXTINGUISHER
  - REFLECTIVE TRIANGLES
  - FLAGS - FLARES - FUSEES
  - SPARE BULBS & FUSES
  - SPARE SEAL BEAM

- ☐ SUSPENSION SYSTEM
- ☐ STARTER
- ☐ STEERING
- ☐ TACHOGRAPH
- ☐ TIRES
- ☐ TIRE CHAINS
- ☐ TRANSMISSION
- ☐ WHEELS AND RIMS
- ☐ WINDOWS
- ☐ WINDSHIELD WIPERS
- ☐ OTHER

TRAILER(S) NO.(S) _____

- ☐ BRAKE CONNECTIONS
- ☐ BRAKES
- ☐ COUPLING DEVICES
- ☐ COUPLING (KING) PIN
- ☐ DOORS

- ☐ HITCH
- ☐ LANDING GEAR
- ☐ LIGHTS - ALL
- ☐ ROOF
- ☐ SUSPENSION SYSTEM

- ☐ TARPAULIN
- ☐ TIRES
- ☐ WHEELS AND RIMS
- ☐ OTHER

REMARKS: _____
_____
_____
_____
_____
_____
_____

☐ CONDITION OF THE ABOVE VEHICLE IS SATISFACTORY

DRIVER'S SIGNATURE: _____
☐ ABOVE DEFECTS CORRECTED
☐ ABOVE DEFECTS NEED NOT BE CORRECTED FOR SAFE OPERATION OF VEHICLE
MECHANIC'S SIGNATURE: _____ DATE: _____

DRIVER'S SIGNATURE: _____ DATE: _____

*FIG. 7 (PRIOR ART)*

SYSTEM AND PROCESS TO ENSURE PERFORMANCE OF MANDATED SAFETY AND MAINTENANCE INSPECTIONS

RELATED APPLICATIONS

This application is a continuation of a patent application, Ser. No. 10/915,957, filed on Aug. 11, 2004, now issued as U.S. Pat. No. 7,557,696, which itself is a continuation-in-part of prior application Ser. No. 10/219,892, filed on Aug. 15, 2002 and now issued as U.S. Pat. No. 6,804,626 on Oct. 12, 2004, which itself is a continuation-in-part of prior application Ser. No. 09/951,104, filed on Sep. 11, 2001 and now issued as U.S. Pat. No. 6,671,646 on Dec. 30, 2003, the benefit of the filing dates of which is hereby claimed under 35 U.S.C. §120.

BACKGROUND

It is widely accepted that a significant reduction in accidents involving commercial trucks and trailers is likely to be achieved by ensuring that key components of such equipment are inspected on a regular basis. Such inspections can detect worn tires and brakes before they cause an accident.

To avoid accidents caused by defective equipment, Federal law presently requires that commercial drivers make a visual inspection of specific components on a truck (i.e., tractor and trailer), such as the brake system, fuel system, warning lights, tires, etc., performing pre- and post-trip inspections of these basic, but critical components. An exemplary vehicle inspection report listing the components and systems that must be inspected by a driver to satisfy the DOT regulations is illustrated in FIG. 7. However, under the current system, a driver is only required to fill out a paper log and keep it on file for 90 days. Many experts report that less than half of the drivers ever perform the check. Instead, many drivers simply fill out the report while seated in the cab of the truck or in a coffee shop. The report is meaningless unless the listed components and systems have actually been inspected. For example, a driver who fails to actually inspect components on his vehicle will fail to detect that brake fluid is leaking from a hydraulic master brake cylinder. As a result, the brakes on the driver's truck may fail, potentially causing a serious accident.

A signed inspection report does not provide any assurance that a driver actually inspected the components included on the report. It would be desirable to provide technology to at least ensure that a driver (or other person doing an inspection) was physically present in the vicinity of each component requiring inspection, even if the driver is not compelled to affirmatively inspect all of the components. Most people, if required to actually walk to a component such as a tire of a truck, will then be more willing to at least look at the condition of the component, particularly if the task of indicating the condition of the component if there is a problem, is made relatively simple and efficient.

Encouraging safety inspections of equipment by creating a record providing evidence that a person doing the inspection actually visited each component that must be inspected has utility in many other applications and for many other types of equipment than trucks in the transportation industry. The concept is also useful in confirming the safe operating condition of machinery and components in other systems in which accidents related to equipment malfunction and failure must be avoided. For example, such a need exists in high-risk chemical and petrochemical operations, where periodic inspections of valves, pressure vessels, gages, and other components must be carried out to avoid potentially disastrous and costly accidents in which significant loss of life and property might occur.

SUMMARY

This application specifically incorporates by reference the disclosures and drawings of each patent application and issued patent identified above as a related application.

Disclosed herein are a method is defined for providing a record indicating that a location or component of a vehicle or other type of apparatus or system was visited during an inspection. In this method, a portable device is provided for use in recording data related to the inspection. The portable device includes a sensor that produces a signal indicative that an operator has positioned the portable device proximate a location or component. A record of the signal produced by the sensor is made and is stored within the portable device, providing evidence that the operator was sufficiently close to the location or component to make an inspection of the location or component.

The method further includes the step of enabling the operator to store an indication of a condition of the location or component in the portable device. Preferably, the portable device provides a prompt that indicates the location or component the operator is to inspect. After the operator has inspected the location or component, a plurality of different states of the location or component are displayed to the operator, enabling the operator to select the state observed during the inspection. If the location or component needs servicing or is unusable, the operator can select one of a plurality of different possible conditions to indicate an observed condition of the location or component. A record of the condition selected by the operator is then stored in the portable device. The record of the signal, the state, and any condition selected by the operator are transferred from the portable device to a more permanent storage at a remote site that is separate from the portable device, either immediately after the inspection or at a later time. Preferably, each record is transmitted to the remote site using a data signal conveyed over a wire network and/or a wireless network.

The method further includes the step of affixing a token adjacent to the location or component. The sensor responds to the token to detect when the portable device is proximate the location or component. The token causes the signal produced by the sensor to identify the location or component, e.g., a specific tire on a vehicle or a specific system component of a system or other apparatus, or a particular location. In most applications, a plurality of tokens are provided, each token being associated with and affixed adjacent to a different one of the plurality of components or locations. The token then causes the signal produced by the sensor to identify the location or component when the portable device is proximate the location or component associated with the token. Also, different predetermined ranges can be specified for the plurality of location or components, so that an appropriate predetermined range can be specified for each location or component.

Another aspect of the concepts disclosed herein are directed to a system for providing evidence that a plurality of components were visited during an inspection. The system includes a plurality of tokens, each of which is associated with a different location or component that is to be checked during the inspection and affixed adjacent to the location or component. Also included in the system is the portable device, which is adapted to be transported to each location or component to be inspected during the inspection. The portable device includes a housing, a display, an operator interface, and a memory in which machine instructions and data are stored. A sensor included with the portable device detects when the portable device is proximate each of the plurality of tokens, and thus, within a predetermined maximum distance from each of the locations or components with which the plurality of tokens are separately associated. The sensor then produces a signal indicative that the portable device is within the predetermined maximum distance from the location or component. A controller is coupled to the display, the memory, the operator interface, and the sensor and executes the machine instructions causing the memory to store data indicative of each component visited during the inspection in response to the signal produced by the sensor. Other functions implemented by the system are generally consistent with the steps of the method described above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a schematic diagram of a tractor and trailer equipped with tokens at each component to be inspected, illustrating a person using a portable device in accord with the concepts disclosed herein;

FIG. 2 is a top plan view of a portable device for use in making a safety inspection of a tractor and trailer, showing a message that prompts the operator to inspect the left rear tires of the tractor;

FIG. 3 is a schematic block diagram of the functional components included in the portable device of FIG. 2;

FIG. 7 (Prior Art) is an exemplary manually-completed inspection record used for safety inspections of tractors and trailers, illustrating the specific components and systems that are required to be inspected.

DESCRIPTION

Figure 4:
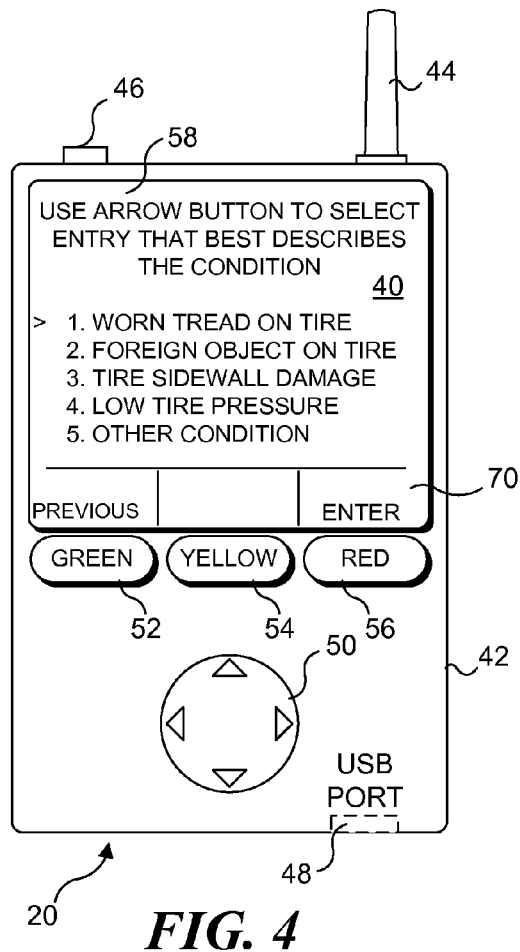
FIG. 4 is a top plan view of the portable device of FIG. 2, illustrating a menu that indicates possible conditions of tires in need of service.

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Utility of the Concepts Disclosed Herein

The concepts disclosed herein are applicable in recording data resulting from a safety inspection of almost any type of equipment, apparatus, or system and is applicable to other types of inspections in which it is desirable to maintain a data record as evidence that the person making the inspection was actually physically present at a checkpoint or component requiring inspection. While the data accumulated with the concepts disclosed herein are not conclusively presumptive evidence that each component of a system was indeed carefully inspected, in most cases, if a person is required to visit a checkpoint or component, it is very likely that the person will actually inspect the component. By encouraging a person making an inspection to be physically close enough to a component to carry out an inspection, and by providing evidence of that fact in the data recorded, there is at least a justifiable presumption that the person actually did the inspection.

FIG. 1 illustrates a tractor-trailer 10 with which an embodiment of the concepts disclosed herein are usable to carry out a safety inspection. Tractor-trailer 10 is provided with a plurality of tokens affixed adjacent to each checkpoint or component that is to be inspected. While only a few of the tokens are illustrated in FIG. 1, FIG. 7 lists all of the components or systems that should be inspected if a driver is to be in compliance with the DOT regulations regarding pre- and post-inspections of such vehicles. A token will be affixed adjacent to the components and systems listed in FIG. 7, although several components might be associated with the same token. For example, in the engine compartment, one token might be used for both the radiator and the belts. As a driver moves about the tractor and trailer, evidence that the driver or the person doing the inspection moved sufficiently close to the components being inspected so that the inspection could actually take place is recorded in a portable device 20. Further details of portable device 20 are described below.

For the few tokens illustrated in FIG. 1, the relevance of the disposition of the token adjacent to a corresponding component of the tractor-trailer 10 should be evident. For example, token 12 is disposed adjacent to tandem dual rear tires 14 on the trailer. Since all the tires of the tandem dual rear wheels on the left rear of the trailer are readily visible from a position adjacent to token 12, a single token is sufficient to determine that the driver was sufficiently close so that all four tires at the left rear of the trailer could be readily inspected. Similarly, tandem dual wheels 18 on the left rear of the tractor are readily inspected when an observer 22 is positioned as shown in FIG. 1. In this position, the observer moves portable device 20 within a maximum predefined range of token 16, which is exposed above tandem dual wheels 18. Portable device 20 detects and responds to token 16, recording data indicating that the driver was in a position to inspect tandem dual rear wheels 18 on the tractor. It is contemplated that the operator may initiate the recognition of a token by activating a switch, or the portable device can instead simply respond when a token is sufficiently close to the portable device.

Other tokens 24, 26, 30, and 32 are illustrated adjacent other components of the tractor that are part of the safety inspection. For example, token 26 is affixed adjacent a tire 28 on the right front of the tractor, while tokens 30 and 32 are accessible if the front hood of the tractor is opened and are disposed adjacent the hydraulic brake master cylinder and the engine belts/radiator, respectively (not shown separately).

For each token there is a predetermined maximum distance that portable device 20 can be held from the token that will enable the portable device to detect the token, and thus the component that is associated with it in order to produce a record as evidence that the person holding the portable device was in a position to inspect the component. Depending upon the component to be inspected and the type of token, different predetermined maximum distances may be assigned to the various components. The different predetermined maximum distances might be implemented by partially shielding a token to vary the distance at which the portable device can detect the token.

Operator 20 is prompted to approach the next component in a series of components that must be checked during the safety inspection by a message 58 appearing on a display 40 of portable device 20, as shown in FIG. 2. For example, if operator 22 has just completed the inspection of tandem dual tires 14 on the left rear of the truck, display 40 provides a prompt 58 indicating that the operator should "verify tire condition—left rear of tractor." A sensor 46 on portable device 20 responds to token 16 when the portable device is held less than the predetermined maximum distance from token 16 by producing a signal indicating that the portable device was within the required range of tandem dual tires 18 to enable the operator to inspect the tires. Display 40 also provides a prompt 60 to operator 22 requesting that the operator indicate whether the tire condition is okay. If so, the operator presses a green control button 52 corresponding to the message "YES, OK." However, if during the visual inspection of the tires the operator determines that they require servicing, the operator is prompted to depress a yellow control button 54 on the portable device. Certain conditions such as a tread separation or a nail or other sharp object lodged in the tire would likely lead the person doing the inspection to depress a red control button 56, indicating a safety problem that requires the operator to refer to a supervisor who will likely elect to delay the trip until the tire is repaired and/or replaced or take other appropriate action depending upon the nature of the component and the type of problem that makes the component unsafe to use. Portable device 20 also includes a cursor control 50, which is a four-position switch that enables a cursor (not shown in this figure) to be moved up or down, and left or right. Cursor control 50, green, yellow, and red control buttons 52, 54, and 56 and display 40 are all disposed on a front surface of a housing 42 of portable device 20. Sensor 46 is disposed on the top edge of housing 42, while an optional universal serial bus (USB) port 48 is disposed on the edge of housing 42, opposite from sensor 46.

An antenna 44 is also disposed on the top edge of the housing for transmitting radio frequency (RF) transmissions to a remote data storage site 61 that is used for long-term storage of data resulting from safety inspections. The data produced by a safety inspection indicates each of the components of the vehicle (or other system or apparatus being inspected) that were visited by the operator, so that the portable device was positioned within the predetermined maximum distance from the token associated with the component, and also indicates the status of the component. In the event that the component appears to need service or represents a safety problem (as would be evident if the operator depressed yellow control button 54 or red control button 56, respectively), the operator is prompted to select one of a plurality of predefined conditions that justify the state of the component determined by the operator and best represent its observed condition.

If the state of the component is okay so that green control button 52 is depressed, i.e., if the component does not require any service and is usable or otherwise within its nominal operating parameters, there is no need to provide an indication of the condition of the component. The condition need only be recorded as part of the data stored in the portable device if either yellow control button 54 or red control button 56 is depressed by the operator to indicate the state of the component being other than "OK."

A further example illustrating the selection of a condition relating to the example shown in FIG. 2 is included in FIG. 4. As shown in FIG. 4, if the operator has indicated that the state of the tires is such that they need service by pressing yellow control button 54, portable device 20 automatically displays several possible conditions that would have led an operator to indicate that state. In the example shown, message 58 prompts the operator to use the arrow button (i.e., cursor control 50) to select a possible condition from among the listed options that best describes the observed condition of the tires. Display 40 includes five possible conditions, the last of which covers any condition that might not be included among the first four that are listed. Using cursor control 50, the operator can move the cursor to the displayed statement that best describes the observed condition of the tire and then can depress red control 56, which corresponds to an "Enter" menu option 70 on display 40 for this screen. Green control 52 can be depressed to select a "Previous" display, if the operator elects to reconsider the state of the component that was previously selected.

FIG. 3 illustrates functional components 60 that are included in portable device 20, either on or inside housing 42. A central processing unit (CPU) 62 comprises the controller for portable device 20 and is coupled bi-directionally to a memory 64 that includes both random access memory (RAM) and read only memory (ROM). Memory 64 is used for storing data in RAM and machine instructions in ROM that control the functionality of CPU 62 when executed by it. CPU 62 is also coupled to receive operator input from controls 68. Collectively, controls 68 include green control button 52, yellow control button 54, red control button 56, and cursor control 50. In addition, CPU 62 provides text and graphics to display 40 for the prompts and other messages, and menu items and options from which the operator can select using cursor control 50.

After operator 22 has visited each of the checkpoints required for the safety inspection, the operator can optionally transmit the data that has been collected during the inspection to remote data storage site 61 through a RF transmission via antenna 44. The data provide evidence that the operator has visited the components and indicate the state and condition of the components that were visited and inspected. Alternatively, optional USB port 48 on portable device 20 can be coupled to a network interface 63 on an external cradle (not shown), which is in communication with remote data storage 65, as shown in FIG. 2. In FIG. 3, CPU 62 is shown communicating data to transmitter 66 (or through another data link) using a wire and/or wireless data communication link. The data collected and stored in memory 64 of portable device 20 during the safety inspection can thus be safely transferred to the remote data storage site and retained for as long as the data might be needed.

In some cases, it may be preferable to transmit the data to the remote site immediately after making a safety inspection to ensure that the data retained in memory 64 are not lost should an accident occur that destroys portable device 20. An accident destroying the evidence that the safety inspection was implemented could have an adverse effect during any litigation related to the accident. However, since the risk of such an accident is relatively remote, it is contemplated that an operator may collect the data from a number of safety inspections in memory 64 and then subsequently upload the data to remote data storage 65 by coupling the data to a cradle (not shown) that includes a USB port terminal and network interface. The cradle might be maintained by a carrier at a freight terminal.

Alternatively, the cradle might be disposed at a different site and/or connect to the remote data storage site through other types of communication links. One example of such a communication system is the OMNITRACS™ satellite mobile communication system sold by Qualcomm Corporation that enables drivers on the road and carriers to remain in communication with each other and enables the carrier to monitor the location of a tractor-trailer during a trip. By linking portable device 20 through USB port 48 to such a data communication system, the data stored within memory 64 can readily be transmitted to a remote site maintained by the carrier for long-term storage, even while a trip is in progress.

The tokens that are affixed at various points on the tractor-trailer (or adjacent components of other types of systems or apparatus unrelated to a vehicle) can be of several different types, depending upon the type of sensor 46 that is included on portable device 20. In a preferred embodiment, the token that is preferably employed is a radio frequency identification (RFID) tag that is attached with a fastener or an adhesive to a point on a frame or other support (not shown) adjacent to the component associated with the token. One type of RFID tag that is suitable for this purpose is the WORLDTAG™ token that is sold by Sokymat Corporation. This tag is excited by an RF transmission from portable device 20 via antenna 44. In response to the excitation energy received, the RFID tag modifies the RF energy that is received from antenna 44 in a manner that specifically identifies the component associated with the RFID tag, and the modified signal is detected by sensor 46.

An alternative type of token that can also be used in this invention is an IBUTTON™ computer chip, which is armored in a stainless steel housing and is readily affixed to a frame or other portion of the vehicle (or other type of apparatus or system), adjacent to the component associated with the IBUTTON chip. The IBUTTON chip is programmed with JAVA™ to provide a recognition signal when interrogated by a signal received from a nearby transmitter, such as from antenna 44 on portable device 20. The signal produced by the IBUTTON chip is received by sensor 46, which determines the type of component associated with a token. This type of token is less desirable since it is more expensive, although the program instructions that it executes can provide greater functionality.

Yet another type of token that might be used is an optical bar code in which a sequence of lines of varying width encode light reflected from the bar code tag. The encoded reflected light is received by sensor 46, which is then read by an optical detector. Bar code technology is well understood in the art and readily adapted for identifying a particular type of component and location of the component on a vehicle or other system or apparatus. One drawback to the use of a bar code tag as a token is that the bar code can be covered with dirt or grime that must be cleaned before the sequence of bar code lines can be properly read. If the bar code is applied to a plasticized adhesive strip, it can readily be mounted to any surface and then easily cleaned with a rag or other appropriate material.

Yet another type of token usable in the concepts disclosed herein are a magnetic strip in which a varying magnetic flux encodes data identifying the particular component associated with the token. Such magnetic strips are often used in access cards that are read by readers mounted adjacent to doors or in an elevator that provides access to a building. However, in the concepts disclosed herein, the magnetic flux reader comprises sensor 46 on portable device 20. The data encoded on such a token is readily read as the portable device is brought into proximity of the varying magnetic flux encoded strip comprising such a token.

As yet another alternative, an active token can be employed that conforms to the BLUETOOTH™ specification for short distance data transfer between computing devices. However, it is likely that the range of the signal transmitted by the token would need to be modified so that it is substantially less than that normally provided by a device conforming to the BLUETOOTH specification. It is important that the portable device be able to detect that it is proximate to the component only within a predetermined maximum range selected to ensure that the operator is positioned to actually carry out an inspection of the component.

Logical Steps Implemented in the Concepts Disclosed Herein

Figure 5:
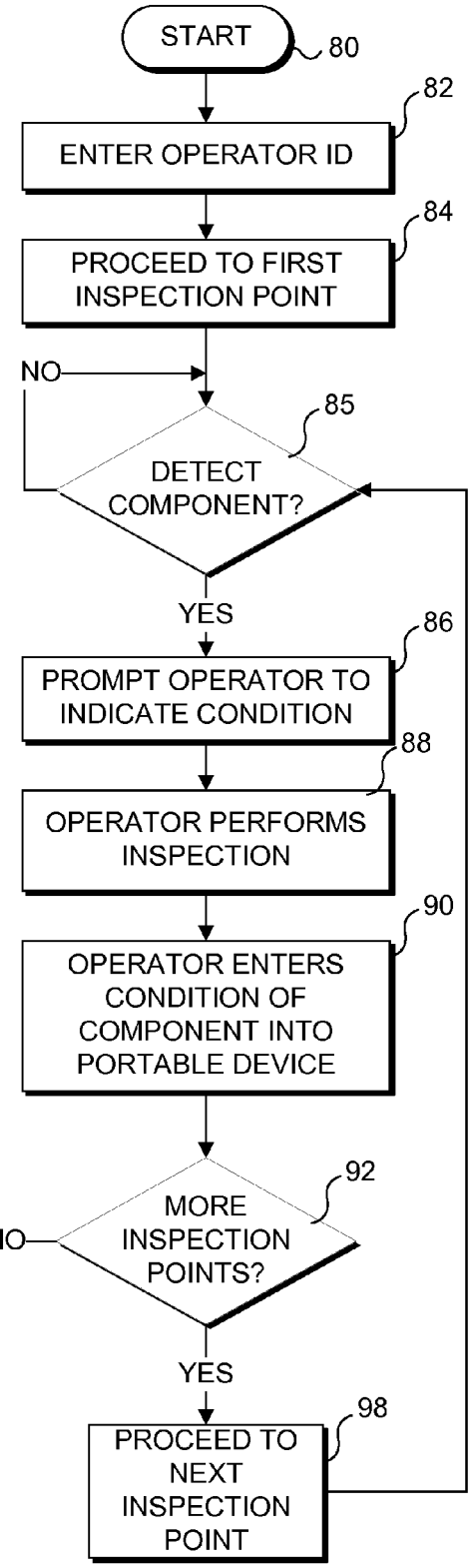
FIG. 5 is a flow chart showing the steps followed in carrying out a safety inspection in accord with the concepts disclosed herein.

FIG. 5 illustrates the logical steps implemented in connection with the concepts disclosed herein to carry out a safety inspection of a vehicle or other apparatus or system. From a start block 80, a step 82 provides for manual entry of an operator identification (ID) into a data record, or the operator ID can already be stored in memory of the portable device, or can be automatically entered in response to a special operator ID tag disposed on the vehicle. Cursor control 50 is employed to sequentially select digits from a displayed list, to input the operator ID for the individual making the safety inspection. The operator ID might be a four (or more) digit number or alphanumeric code. Alternatively, a plurality of possible operator IDs might be displayed as a list on portable device 20, enabling the operator to select his/her operator ID from the list using cursor control 50 and one of the three control buttons.

Once the operator ID is entered, portable device 20 prompts the operator to proceed to a first inspection point. For example, as indicated in FIG. 2, message 58 prompts the operator to verify the tire condition on the left rear of the tractor. A decision step 85 determines if the portable device has detected the token associated with the component that is next to be inspected. If not, the logic loops until the component is detected. Once sensor 46 on portable device 20 has detected the token associated with the current component to be inspected, the logic then advances to a step 86 in which the operator is prompted to indicate a state of the component (and possibly, its condition). In a step 88, the operator performs the inspection, which may involve visually observing the state and condition of the component, or carrying out other steps that might be required to confirm the state and condition of the component. It is contemplated that in some types of inspections, a series of steps might be required to test the component to determine if it is operating properly, needs maintenance or repair, or is unusable. Again, portable device 20 can be programmed to provide appropriate prompts to direct the operator through a series of steps required to carry out the inspection of such a component. Accordingly, in a step 90 the operator selectively enters the condition of the component into portable device 20 using the control buttons and cursor control 50.

A decision step 92 determines if there are further inspection points in the safety inspection being carried out. If not, a step 94 provides for transmitting or loading the inspection data into storage at a remote site; this step can be done immediately after the inspection is completed, or at some later time, perhaps after additional safety inspections have been completed. Once the data are transmitted to the remote site for long-term storage, the process is completed in a step 96.

Assuming that further inspection points remain in the safety inspection at decision step 92, a step 98 provides for the operator to proceed to the next inspection point, which will again be determined by a prompt displayed to the operator on display 40 of portable device 20. The logic then loops back to decision step 85, which determines if the sensor on the portable device has detected the component, indicating that the portable device is within the predefined maximum range of the token, thus ensuring that the operator is sufficiently close to the component to inspect it.

Figure 6:
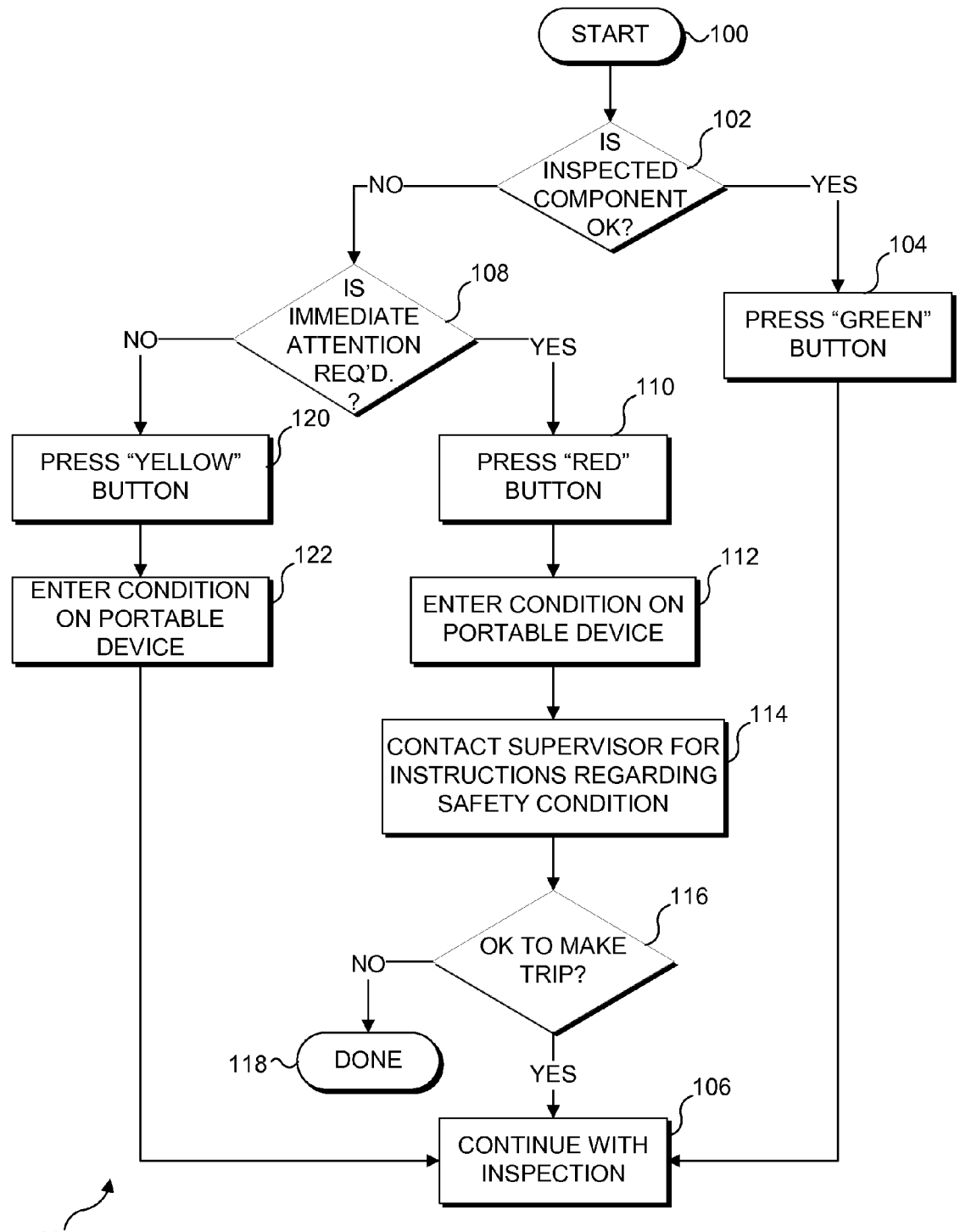
FIG. 6 is a flow chart illustrating the steps employed in recording a condition of a component that is being inspected using the portable device of FIGS. 2 and 4.

Further details of step 90 are illustrated in FIG. 6. From a start block 100, a decision step 102 determines if the inspected component is okay. If so, the operator presses green control button 52 in a step 104. Since the component is okay, nothing further is required for that component, and the logic then proceeds to a step 106, which provides that the operator can continue with the inspection, i.e., proceed with decision step 92 in FIG. 5.

However, if the determination in decision step 102 indicates that the inspected component is not okay, a decision step 108 enables the operator to determine if immediate attention is required. If so, the operator presses red control button 56 at a step 110 and enters the condition of the component on the handheld unit. For example, if the operator is inspecting a tire and determines that the tread of the tire is separating, the tire should not be used, but should instead be replaced, the operator would use the cursor control on the portable device to select an option for the condition "tread separating from tire" at a step 112. In most inspections, the operator would be required to contact a supervisor for instructions regarding the safety condition at a step 114. In the example just noted, the supervisor would likely arrange for the tire to be replaced by maintenance or repair personnel.

In some cases, a supervisor might override the operator's determination of the state of the component based upon the reported condition. Therefore, a decision step 116 determines if the supervisor has given authorization to the operator to make the trip, scheduling a later repair of the component. If so, the logic proceeds to step 106, in which the operator continues with the inspection as described above. If not, there is no further need to inspect the remainder of the vehicle at that point, since the complete inspection will need to be carried out again after the unsafe condition has been corrected, e.g., by replacing the defective tire. The logic is then done, as indicated in step 118.

In the event that the operator determines that immediate attention is not required at decision step 108, at a step 120, the operator presses yellow control button 54 on portable device 20. The operator then selects and enters the condition noted on the portable device, as indicated in a step 122. In the example shown in FIG. 4, six possible conditions are indicated by statements on display screen 40 for a tire that is still usable but needs service. In this case, the operator employs cursor control 50 to move the cursor to a selected statement that thus describes the observed condition of the component and then depresses red control button 56 to enter the condition, creating a record of the state and condition of the component currently being inspected that is retained within the memory of the portable device. Thereafter, the logic proceeds to step 106, in which the operator continues with the inspection.

Alternative to Portable Device

While it is likely that an initial preferred embodiment will employ portable device 20, it is also contemplated that an accessory might be provided for a personal digital assistant (PDA), such as the PALM™ PDA, that would enable the PDA to be used for the same functions as portable device 20. The accessory to the PDA will include a sensor to detect when the PDA is within the predetermined maximum range from the token associated with the component currently being inspected. The conventional controls on the PDA can be used to make and enter a selection. Furthermore, instead of using a cursor control, it is also contemplated that a touch screen display might instead be used for making selections of menu items and other options presented to the operator. In addition, the PDA would need to be programmed to carry out the functions implemented by portable device 20, as described above.

Other Applications of the Concepts Disclosed Herein

Although the concepts disclosed herein will initially be used in connection with safety inspections of tractors and trailers in the commercial trucking industry, there are many other types of safety inspections unrelated to vehicles in which it is equally applicable. For example, in a chemical processing plant or a petroleum refinery it is common for technicians to make periodic safety inspections of valves, gauges, reactors, pressure vessels, and other types of processing equipment and system components to ensure that they are operating properly and within nominal or acceptable limits. During an inspection, a technician may note that a valve is leaking slightly, and schedule it for repair or replacement at a later date. Clearly, if the leak is of a non-hazardous substance and is insignificant in volume, there might well be no reason to shut down the process line in which the valve is installed simply because of the leaking valve. However, if the valve is used in controlling an extremely hazardous or toxic substance, even a small leak may be unacceptable. In this case, the technician should immediately report the condition to a supervisor who would then likely shut down the process or divert the flow of hazardous substance to a different process line to enable the condition to be corrected by immediate replacement or repair of the valve. Based upon the preceding discussion that discloses how a first preferred embodiment of the concepts disclosed herein are used in recording data related to safety inspections of a vehicle, it should be evident that portable device 20 is also readily adapted to recording data from other inspections. In the example just noted, a technician would be prompted to inspect the valve, and once the portable unit was within a predetermined distance of the valve, would be prompted to indicate a state of the valve. If the technician depressed either yellow control button 54 or red control button 56, the display would provide a menu of possible conditions from which the technician could select, using cursor control 50 and red control button 56 to indicate the observed condition of the valve.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for providing a record that a location was visited during an inspection, comprising the steps of:
   (a) providing a portable device for use in recording data related to the inspection, said portable device including a sensor that detects when the portable device is disposed proximate the location, producing a signal indicative thereof;
   (b) enabling an operator to move the portable device proximate the location;
   (c) in response to the sensor detecting that the portable device is disposed proximate the location, displaying to the operator a plurality of different possible conditions associated with the location;

(d) enabling the operator to select one of the plurality of different possible conditions, to indicate a condition associated with the location as determined by the operator; and (e) storing in the portable device a record of said one of the plurality of different possible conditions selected by the operator, the record further including an indication that the sensor detected the portable device as being disposed proximate to the location, said record providing evidence that the operator was sufficiently close to the location to make an inspection of the location.

2. The method of claim 1, wherein the plurality of conditions include:

(a) a first condition in which the location is safe for use;

(b) a second condition in which the location requires servicing, but is still usable; and (c) a third condition in which the location is not safe for use.

3. The method of claim 2, wherein if either the second condition or the third condition is identified by the operator who making the inspection, further comprising the step of displaying a plurality of possible states of the location to enable the operator to select one of the states to indicate why the operator selected either the second condition or the third condition, and including the state in the record.

4. The method of claim 3, wherein the plurality of states is unique for at least one location.

5. The method of claim 1, wherein the plurality of conditions are unique for at least one location.

6. The method of claim 1, wherein the sensor is configured to detect a token exhibiting a predefined characteristic, further comprising the step of a positioning a token exhibiting the predefined characteristic proximate each location to be inspected, such that:

(a) a first token is disposed proximate a first location, and the sensor must be disposed within at least a first distance from the first token in order to detect the first token;

(b) a second token is disposed proximate a second location, and the sensor must be disposed within at least a second distance from the second token in order to detect the second token; and (c) the first distance is greater than the second distance, such that when the sensor is disposed within at least the second distance of the first token, the sensor will detect the first token, but when the sensor is disposed within at least the first distance of the second token, the sensor will not detect the second token.

7. The method of claim 6, wherein each token comprises a radio frequency tag.

8. A method for providing a record that a location was visited during an inspection, comprising the steps of:

(a) providing:

(i) a portable device for use in recording data related to the inspection, said portable device including a sensor that detects when the portable device is disposed proximate a token exhibiting a predefined characteristic, producing a signal indicative thereof;

(ii) a first token that is disposed proximate a first location, such that the sensor must be disposed within at least a first distance from the first token in order to detect the first token; and (ii) a second token that is disposed proximate a second location, such that the sensor must be disposed within at least a second distance from the second token in order to detect the second token, the first distance being greater than the second distance;

(b) enabling an operator to move the portable device proximate to the first and second locations;

(c) in response to the sensor detecting that the portable device is disposed at least within the first distance from the first location, storing in the portable device a first record including an indication that the sensor detected that the portable device was disposed proximate the first location, said first record providing evidence that the operator was sufficiently close to the first location to make an inspection of the first location; and (d) in response to the sensor detecting that the portable device is disposed at least within the second distance from the second location, storing in the portable device a second record including an indication that the sensor detected that the portable device was disposed proximate the second location, said second record providing evidence that the operator was sufficiently close to the second location to make an inspection of the second location.

9. The method of claim 8, further comprising the steps of:

(a) in response to the sensor detecting that the portable device is disposed proximate a location to be inspected, displaying to the operator a plurality of different possible conditions associated with the location;

(b) enabling the operator to select one of the plurality of different possible conditions, to indicate a condition associated with the location as determined by the operator; and (c) adding to the record for the location said one of the plurality of different possible conditions selected by the operator.

10. The method of claim 9, wherein the plurality of conditions include:

(a) a first condition in which the location is safe for use;

(b) a second condition in which the location requires servicing, but is still usable; and (c) a third condition in which the location is not safe for use.

11. The method of claim 10, wherein if either the second condition or the third conditions is identified by the operator making the inspection, further comprising the step of displaying a plurality of possible states of the location to enable the operator to select one of the states to indicate why the operator selected either the second condition or the third condition, and then including the state in the record.

12. The method of claim 9, wherein the plurality of conditions is unique for at least one location.

13. The method of claim 8, wherein each token comprises a radio frequency tag.

14. A system for providing evidence that a plurality of locations were visited during an inspection, comprising:

(a) a portable device adapted to be transported to each of the plurality of locations to be inspected during the inspection, said portable device including:

(i) a housing;

(ii) a display;

(iii) an operator interface;

(iv) a memory in which machine instructions and data are stored;

(v) a sensor for detecting when the portable device is proximate any of the plurality of locations, and in response thereto producing a signal indicating that the portable device is proximate to one of the plurality of locations; and (vi) a controller coupled to the display, the memory, the operator interface, and the sensor, said controller executing the machine instructions and causing the memory to store a record indicative of each location visited during the inspection, in response to the signal produced by the sensor, such that whenever the sensor produces the signal indicating that the portable device is proximate to one of the plurality of locations, the controller further executes machine instructions causing a plurality of different possible conditions associated with the location to be presented to the operator on the display, the condition selected by the operator being added to the record for that location.

15. The system of claim 14, further comprising a plurality of tokens to which the sensor responds, each token being associated with a different location that is to be visited during the inspection and being disposed and affixed proximate to said location.

16. A system for providing evidence that a plurality of locations were visited during an inspection, comprising:
  (a) a first token disposed proximate a first location, the first token being configured to be detected when a sensor is disposed within at least a first distance from the first token;
  (b) a second token disposed proximate a second location, the second token being configured to be detected when the sensor is disposed within at least a second distance from the second token, the first distance being greater than the second distance; and
  (c) a portable device adapted to be transported to each location to be visited and inspected during the inspection, said portable device including:
    (i) a housing;
    (ii) a display;
    (iii) an operator interface;
    (iv) a memory in which machine instructions and data are stored;
    (v) the sensor for detecting when the portable device is proximate one of the first and second locations, said sensor producing a signal whenever the portable device is disposed within the first distance from the first token and whenever the portable device is disposed within the second distance from the second token; and
    (vi) a controller coupled to the display, the memory, the operator interface, and the sensor, said controller executing the machine instructions and causing the memory to store a record indicative of each location visited during the inspection, in response to the signal produced by the sensor.

17. The system of claim 16, such that whenever the sensor produces the signal indicating that the portable device is proximate one of the first and second locations, the controller further executes machine instructions causing a plurality of different possible conditions associated with the location to be displayed to enable an operator to select one of the conditions, the condition selected by the operator being added to the record for that location to indicate the condition of said location determined by the operator.

18. A method for providing a record that a mandated vehicle inspection has been performed, comprising the steps of:
  (a) identifying a plurality of components that must be inspected to comply with the mandated vehicle inspection;
  (b) for each component, identifying a location on the vehicle at which the component can be inspected;
  (c) installing a token at each such location;
  (d) providing a portable device for use in recording data related to the mandated vehicle inspection, said portable device including a sensor capable of detecting the token installed at each location, the portable device producing a sensor signal when the portable device is proximate to each token;
  (e) enabling an operator to move the portable device proximate to the token installed at each location; and
  (f) automatically producing a record of the sensor signal produced by the sensor, the sensor signal comprising data that are stored in the record within the portable device, said record providing evidence that the operator was actually present at each location on the vehicle at which the mandated inspection could have been performed.

19. The method of claim 18, further comprising the steps of:
  (a) after the sensor detects the token at a location, displaying to the operator a plurality of different possible conditions of the component at the location;
  (b) enabling the operator to select one of the plurality of different possible conditions, to indicate a condition of the component determined by the operator; and
  (c) adding said one of the plurality of different possible conditions selected by the operator to the record stored within the portable device for the location.

20. A method for providing a record that a mandated inspection has been performed, comprising the steps of:
  (a) identifying a plurality of components that must be inspected to comply with the mandated inspection;
  (b) for each component, identifying a location from which the component can be inspected;
  (c) installing a token at each such location;
  (d) providing a portable device for use in recording data related to the mandated inspection, said portable device including a sensor capable of detecting the token installed at each location, the portable device producing a sensor signal when the portable device is proximate to each token;
  (e) enabling an operator to move the portable device proximate to the token installed at each location; and
  (f) automatically producing a record of the sensor signal produced by the sensor, the sensor signal comprising data that are stored in the record within the portable device, said record providing evidence that the operator was actually present at each location from which the mandated inspection could have been performed.

* * * * *